(12) United States Patent
Liu et al.

(10) Patent No.: US 7,068,689 B2
(45) Date of Patent: Jun. 27, 2006

(54) FREQUENCY-CONVERTED LASER APPARATUS WITH FREQUENCY CONVERSION CRYSTALS

(75) Inventors: Baining Liu, Berlin (DE); Wolfgang Gries, Berlin (DE)

(73) Assignee: Spectra-Physics GmbH, Darmstadt (DE)

(*) Notice: Subject to any disclaimer, the term of this patent is extended or adjusted under 35 U.S.C. 154(b) by 27 days.

(21) Appl. No.: 09/765,226

(22) Filed: Jan. 18, 2001

(65) Prior Publication Data

US 2002/0093996 A1 Jul. 18, 2002

(51) Int. Cl.
*H01S 3/10* (2006.01)

(52) U.S. Cl. .............................. 372/20; 372/22
(58) Field of Classification Search .......... 372/18–25, 372/98, 26, 28, 92, 107, 68, 94, 99; 307/424; 572/18, 22, 98
See application file for complete search history.

(56) References Cited

U.S. PATENT DOCUMENTS

| 4,438,517 A | * | 3/1984 | Bobb et al. | 372/99 |
|---|---|---|---|---|
| 5,117,126 A | * | 5/1992 | Geiger | 307/424 |
| 5,341,236 A | * | 8/1994 | Stappaerts | 359/328 |
| 5,357,537 A | * | 10/1994 | Maker | 372/94 |
| 5,383,198 A | * | 1/1995 | Pelouch et al. | 372/18 |
| 5,406,408 A | * | 4/1995 | Ellingson et al. | 359/330 |
| 5,651,019 A | * | 7/1997 | Goldberg et al. | 372/68 |
| 5,687,186 A | * | 11/1997 | Stultz | 372/92 |
| 5,815,519 A | * | 9/1998 | Aoshima et al. | 372/25 |
| 5,953,354 A | * | 9/1999 | Staver et al. | 372/107 |
| 6,005,878 A | * | 12/1999 | Kung et al. | 372/22 |
| 6,317,449 B1 | * | 11/2001 | Zanger et al. | 372/100 |
| 6,414,973 B1 | * | 7/2002 | Hwu et al. | 372/19 |
| 6,526,073 B1 | * | 2/2003 | Spinelli et al. | 372/22 |
| 6,633,595 B1 | * | 10/2003 | Gries et al. | 372/22 |

* cited by examiner

*Primary Examiner*—Minsun Oh Harvey
*Assistant Examiner*—Tuan N. Nguyen
(74) *Attorney, Agent, or Firm*—Norris McLaughlin & Marcus, P.A.

(57) ABSTRACT

A frequency-converted laser apparatus includes an optical pumping source that produces fundamental laser radiation and an external resonant cavity having one beam path direction-marked frequency conversion crystal within said resonant cavity or just beam path direction-marked frequency conversion crystals without an additional resonant cavity. The "to-be-used" direction of said frequency conversion crystal is well defined or clearly marked. The frequency converted laser radiation after said frequency conversion crystal shows better beam quality and much higher power stability if said frequency conversion crystal is used in the "to-be-used" direction.

11 Claims, 1 Drawing Sheet

FREQUENCY-CONVERTED LASER APPARATUS WITH FREQUENCY CONVERSION CRYSTALS

FIELD OF THE INVENTION

The present invention relates generally to frequency converted lasers using frequency conversion crystals. More specifically, the present invention relates to a solid-state, frequency-converted laser in the ultraviolet spectral region.

BACKGROUND OF THE INVENTION

The technology of diode-pumped solid-state (DPSS) lasers has developed into a dominant driving force for laser technology worldwide in the past few years. Owing to the availability of high-power laser diodes, DPSS laser technology has the potential to replace a wide range of lasers commonly used in industrial and scientific applications as well as to create complete new fields for laser applications.

A growing commercial demand for ultraviolet lasers in recent years has resulted from the important physical fact that a shorter wavelength leads to a reduction of focal spot and image size. Therefore, lithographic structures can, for example, be reduced and information storage densities can be further increased. In the semiconductor industry, the ongoing change to 157 nm lithographic technology and smaller die size means that, to stay competitive, semiconductor manufacturers will have to purchase UV lasers with shorter wavelengths. This impacts primarily not only the sale of excimer lasers and UV optics, but also stimulates the development of new efficient and stable solid-state UV lasers worldwide to replace traditional gas lasers, which require very high power consumption and space but deliver beams of low quality.

The introduction of the first continuous-wave high-power ultra-violet laser at 266 nm in 1998 (see E. Zanger, R. Müller, B. Liu, M. Kötteritzsch, W. Gries, "Diode-pumped cw all solid-state laser at 266 nm", OSA Trends in Optics and Photonics, Vol. 26, pp. 104–111 1999) and the continued engineering of this laser have re-newed or even triggered numerous applications in industrial fields. Good examples are DVD disc-mastering, wafer and mask inspection, fiber Bragg grating writing, circuit board inspection, confocal microscopy, 3D-prototyping, photolithography, capillary electrophoresis, micromachining, interferometric testing of optic production as well as holography, resonance Raman spectroscopy, laser trapping and cooling and isotope separation. Deep UV lasers of high power stability, low noise, excellent beam profile and long lifetime are the prerequisites for all industrial applications mentioned above. Furthermore, a compact laser with plug-in and hands-off operation is desirable in all applications above because all systems themselves may then be made more compact as well as plug & play. The diode-pumped all solid-state laser technology has made this possible.

Because of very limited wavelengths of useful laser crystals it is not possible to build up solid-state lasers in all desirable wavelength ranges. One of the most efficient ways is to use frequency conversion crystals to generate further desirable wavelengths, including the deep UV spectral range. Therefore, nonlinear process based frequency conversion crystals have become one of the key optical components in building up the desired laser systems.

Certain previous inventions are associated with concepts in designing key optical layouts e.g. doubling cavity, see DE 198 14 199, and in avoiding some physical effects having bad impact on the performance of the laser systems, e.g. photorefractive effect, see DE 198 15 362. All these inventions have laid the foundation for the first continuous-wave high-power ultraviolet laser at 266 nm.

It could have been also noticed that the degradation of some optics and crystals in the ultraviolet, especially in the deep ultraviolet regions deteriorates the performance and limit the lifetime of the designed laser systems. Such degradation phenomena are still quite popular in laser systems for the generation of high-power deep UV laser radiation.

Therefore, a laser capable of the elimination of degradation problems of optics and crystals would be desirable. Such a laser would have excellent output stability, low noise and long life-time, and would be simpler and cheaper to maintain in the industrial fields.

SUMMARY OF THE INVENTION

To achieve the foregoing, and in accordance with the purpose of the present invention, one investigation of degradation problems of frequency converting crystals is disclosed, which have been carried out in two laser systems.

One laser system is the diode-pumped continuous wave (cw) laser at 266 nm, accomplished by frequency doubling the 532 nm output of a diode-pumped Neodymium-doped YAG laser with an actively stabilized unidirectional ring cavity, where a minimum number of optical components—two mirrors and one prism are used and a Brewster-cut Beta-Borium Borate ($\beta$-$BaB_2O_4$ or BBO) crystal is used as the frequency doubling crystal.

Another laser system consists of a mode-locked diode-pumped Neodymium-doped Vanadate laser. The output from this oscillator is then amplified in a diode-pumped Vanadate amplifier. The output is then converted to the third harmonic in two frequency conversion crystals, each of which is contained in an oven. Both frequency conversion crystals used are Lithium Triborate ($LiB_3O_5$ or LBO).

Up to now one frequency conversion crystal with the appropriate phase-matching cut can be used in both beam path directions as soon as no different coating is attached to the entrance surface and exit surface of said frequency conversion crystal, e.g. Brewster-cut ones. Also no one pays attention to the beam path direction of the to-be-coated frequency conversion crystal before the coating processes, because there is no difference for the frequency conversion process in both beam path directions.

However, we have found out that the degradation of said frequency conversion crystals is decreased a lot in one of two possible beam path directions of said frequency conversion crystals.

Although this observation is against the conventional knowledge that the frequency conversion process is independent of the propagation direction of said frequency conversion crystal used as stated above, the invention can be verified in several laser systems and in many experiments. All said frequency conversion crystals will be checked to find out the right beam path direction and then marked before they are mounted in the laser systems.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention provides a frequency-converted laser apparatus with beam path direction marked frequency conversion crystals, leading to excellent output power stability, low noise and long lifetime.

Figure 1:
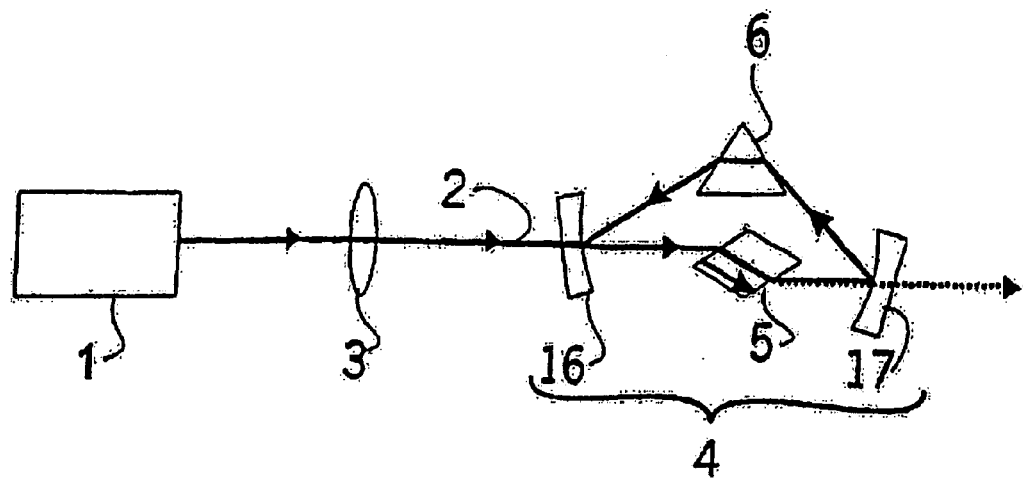
FIG. 1 is a block diagram of a single longitudinal mode frequency-converted solid-state laser according to a first embodiment of the present invention, where the right beam path direction of the frequency conversion crystal is clearly marked.
Figure 2:
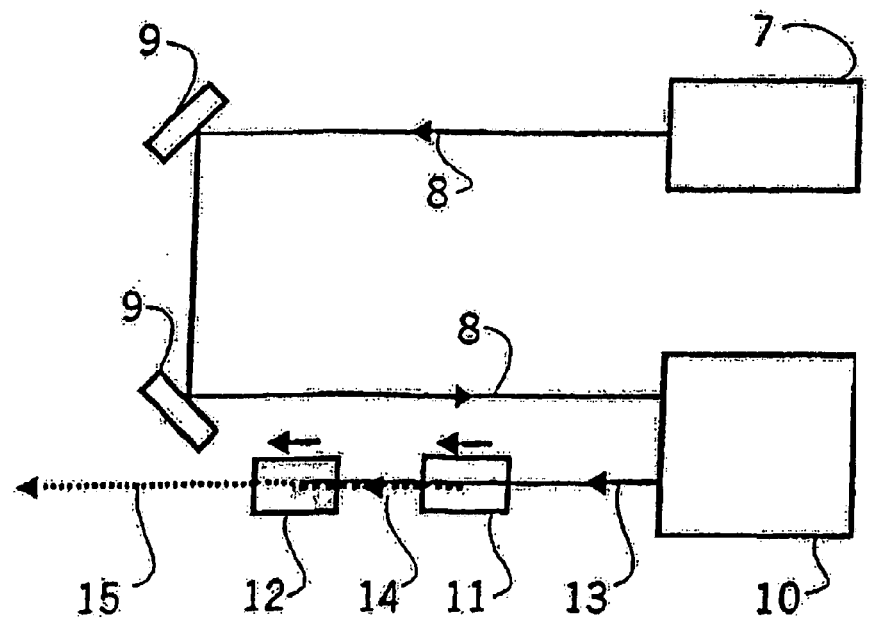
FIG. 2 is a block diagram of a multi longitudinal mode frequency-converted solid-state laser according to an embodiment of the present invention, where the right beam path direction of the frequency-converting crystal is also clearly marked.

While the present invention is susceptible of embodiments in many forms, two exemplary embodiments are schematically shown in FIGS. 1 and 2. The disclosure herein is to be considered as illustrative of the principles of the invention and is not intended to limit the invention to the exemplary embodiments illustrated in the drawings and in the detailed description below.

One embodiment of the present invention is shown in FIG. 1, in which a diode-pumped continuous wave (cw) all solid-state laser at 266 nm is disclosed. This embodiment includes an optical pumping source 1 for producing optical pumping radiation 2, coupling optics 3, an actively stabilized unidirectional ring cavity 4, in which a Brewster-cut frequency conversion crystal 5 is used only in the marked (to-be-used) direction, which has been determined previously. The symmetrical Brewster-angled beam path through a prism 6 inside the cavity 4 guarantees minimum losses and hence maximum power enhancement and efficiency. The cavity length control is done by moving the prism 6 along its symmetry axis using a piezoelectric element. The beam path in the cavity 4 remains not only completely unaffected during this movement but also unaffected in the first order by small tilts of the prism 6 due to possible imperfection of the piezoelectric element.

By using Brewster-cut BBO crystals the high-power cw UV laser can deliver 266 nm radiation with an output power of 1.4 Watt at a green pumping power of 5 W. When the BBO crystal is used in the right beam path direction, the lifetime of the BBO crystal is long and the output power stability is very good. When the BBO crystal is used in the reversed false direction, an counter-propagating radiation of the fundamental wave inside the cavity 4 is found, so that the pumping radiation in the desired direction is depleted and the output power at 266 nm is decreased constantly until to a very low level.

Another embodiment of the present invention is shown in FIG. 2. The output 8 from an oscillator 7 consists of a train of pulses at a repetition rate of 80 MegaHertz (MHz) and duration of 12 picoseconds (ps). The average power output from the oscillator 7 is 5 Watt, which is increased to 19 Watt in an single stage amplifier 10 after routing mirrors 9. The fundamental wavelength of the laser is 1064 nm. A Type I LBO crystal 11 is used in the right beam path direction to frequency double the fundamental 13 to the second harmonic 14 at a wavelength of 532 nm with approximately 50% efficiency. The rest fundamental 13 and second harmonic 14 are then incident on a Type II LBO crystal 12 in the right beam path direction and produce 4 Watt of output 15 at the third harmonic wavelength of 355 nm. When the LBO crystals 11, 12 are used in the reversed false direction, the output power at 355 nm is decreased too and the degradation of the LBO crystals 11, 12 takes place much quicker.

What is claimed is:

1. A method for producing laser radiation comprising the steps of:
   (a) providing an optical pumping source for producing optical pumping radiation;
   (b) arranging a Brewster-cut frequency conversion crystal in a first configuration for frequency conversion, wherein a beam of the optical pumping source passes through the crystal in a first direction, and the normal of a first entrance surface of the Brewster-cut frequency conversion crystal forms a Brewster angle with the beam of the optical pumping source, and measuring a first output power of the converted radiation;
   (c) arranging the Brewster-cut frequency conversion crystal in a second configuration, for frequency conversion, wherein the beam passes through the crystal in a second direction, the second direction being the reversed direction of the first beam path direction, the second configuration being obtained by rotating the crystal by 180 degrees with respect to the first arrangement about an axis perpendicular to the horizontal cross section of the crystal, the normal of a second entrance surface of the Brewster-cut frequency conversion crystal forming a Brewster angle with the beam of the optical pumping source, and measuring a second output power of the converted radiation;
   (d) determining a preferred beam path direction of a frequency conversion crystal by determining the configuration of the first and second configurations which results in a higher output power of the converted radiation over time; and
   (e) amplifying radiation of an optical pumping source by using an optical cavity having at least one frequency conversion crystal disposed such that said crystal is passed by the radiation only in the predetermined preferred beam path direction.

2. A method for producing laser radiation comprising the steps of:
   (a) providing an optical pumping source for producing optical pumping radiation;
   (b) providing a unidirectional ring cavity comprising a single Brewster-cut frequency conversion crystal, a single prism and a mirror arrangement;
   (c) arranging the Brewster-cut frequency conversion crystal in a first directions for frequency conversion, wherein a beam of the optical pumping source passes through the crystal in a first direction, and the normal of a first entrance surface of the Brewster-cut frequency conversion crystal forms a Brewster angle with the beam of the optical pumping source, and measuring a first output power of the converted radiation;
   (d) arranging the frequency conversion crystal in a second configuration for frequency conversion, wherein the beam passes through the crystal in a second direction, the second direction being the reversed direction of the first beam path direction, the second configuration being obtained by rotating the crystal by 180 degrees with respect to the first arrangement about an axis perpendicular to plane of the ring cavity, the normal of a second entrance surface of the Brewster-cut frequency conversion crystal forming a Brewster angle with the beam of the optical pumping source, and measuring a second output power of the converted radiation;
   (f) determining a preferred beam path direction of a frequency conversion crystal by determining the configuration of the first and second configurations, which results in a higher output power of the converted radiation over time; and (g) amplifying radiation of an optical pumping source by using an optical cavity having at least one frequency conversion crystal disposed such that said crystal is passed by the radiation only in the predetermined preferred beam path direction.

3. The method for producing laser radiation according to claim 2, further comprising the steps of:
providing coupling optics disposed between an optical pumping source and a ring cavity.

4. The method for producing laser radiation according to claim 3, wherein the ring cavity is an external resonant unidirectional cavity.

5. The method for producing laser radiation according to claim 4, wherein frequency conversion crystal is a Brewster-cut Beta-Borium Borate (b-BaB$_2$ O$_4$ or BBO) crystal or a Lithium Triborate (LiB$_3$ O$_5$ or LBO) crystal.

6. The method for producing laser radiation according to claim 5, further comprising the step of providing a stage amplifier.

7. The method for producing laser radiation according to claim 3, further providing the step of connecting the prism to a piezoelectric element.

8. A method for producing laser radiation according to claim 2, wherein after the determination of the preferred beam path direction and prior to the amplification of the radiation, the method further comprises the step of: marking the frequency conversion crystal before mounting the frequency conversion crystal into the ring cavity.

9. A method for producing laser radiation comprising the steps of:

(a) arranging an uncoated cubic frequency conversion crystal in a first direction for frequency conversion, wherein a beam of the optical pumping source passes through the crystal in a first direction, and wherein the normal of a first entrance surface of the cubic frequency conversion crystal is parallel with the beam of an optical pumping source, and measuring a first output power of the converted radiation;

(b) arranging the cubic frequency conversion crystal in a second configuration for frequency conversion, wherein the beam passes through the crystal in a second direction, the second direction being the reversed direction of the first beam path direction, the second configuration being obtained by rotating the crystal by 180 degrees with respect to the first arrangement about an axis perpendicular to the horizontal cross section of the crystal, and wherein the normal of a second entrance surface of the cubic frequency conversion crystal is parallel with the beam of the optical pumping source, and measuring a second output power of the converted radiation;

(c) determining a preferred beam path direction of a frequency conversion crystal by determining the configuration of the first and second configurations, which results in a higher output power of the converted radiation over time, (d) coating the output surface of the cubic frequency conversion crystal in respect with preferred beam path direction which corresponds to the entrance surface of the configuration, which results in a lower output power of the converted radiation; and (e) amplifying radiation of an optical pumping source by using an optical cavity having at least one frequency conversion crystal disposed such that said crystal is passed by the radiation only in the predetermined preferred beam path direction.

10. A method for producing laser radiation according to claim 9, wherein after the determination of the preferred beam path direction and prior to the amplification of the radiation, the method further comprises the step of marking the frequency conversion crystal before mounting the frequency conversion crystal into the ring cavity.

11. A method for producing laser radiation comprising the steps of:

(a) providing an optical pumping source for producing optical pumping radiation;

(b) arranging a Brewster-cut frequency conversion crystal in a first configuration of two possible directions for frequency conversion, wherein a beam of the optical pumping source passes through the crystal in a first direction, and the normal of a first entrance surface of the Brewster-cut frequency conversion crystal forms a Brewster angel with the beam of the optical pumping source, and measuring a first output power of the converted radiation;

(c) arranging the Brewster-cut frequency conversion crystal in the a second configuration, of the two possible directions for frequency conversion, wherein the beam passes through the crystal in a second direction, the second direction being the reversed direction of the first beam path direction, the second configuration being obtained by rotating the crystal by 180 degrees with respect to the first arrangement about an axis perpendicular to the horizontal cross section of the crystal, the normal of a second entrance surface of the Brewster-cut frequency conversion crystal forming a Brewster angle with the beam of the optical pumping source; and measuring a second output power of the converted radiation;

(d) determining a preferred beam path direction of a frequency conversion crystal by determining theat direction configuration of the first and second configuration which results in a higher output power of the converted radiation over time;

(e) marking the frequency conversion crystal before mounting the frequency conversion crystal into the ring cavity; and (f) amplifying radiation of an optical pumping source by using an optical cavity having at least one frequency conversion crystal disposed such that said crystal is passed by the radiation only in the predetermined preferred beam path direction.

* * * * *